INVENTOR.
JORGEN I. HAASE

ATTORNEY

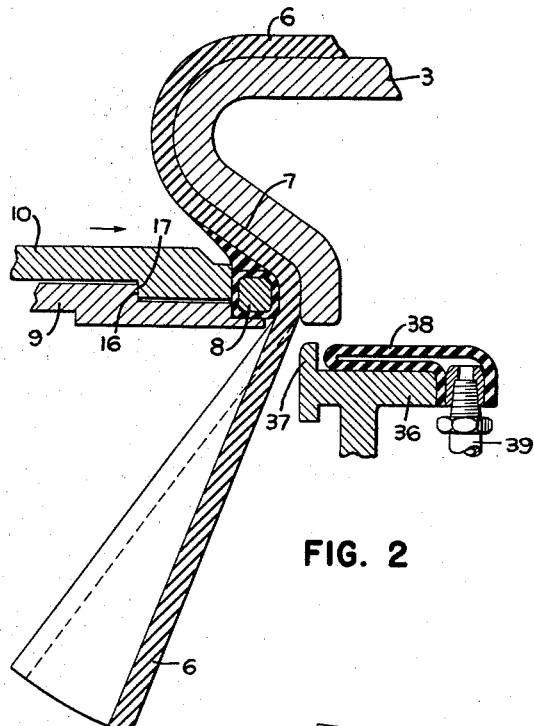
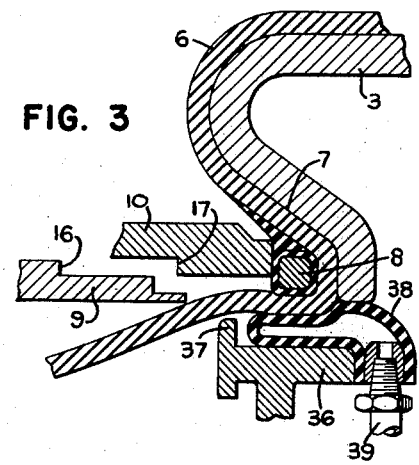
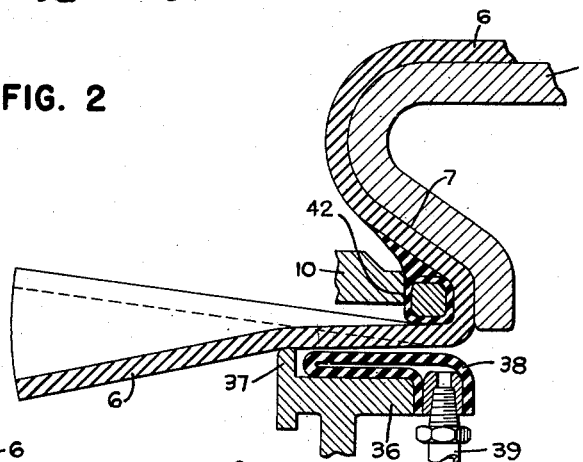
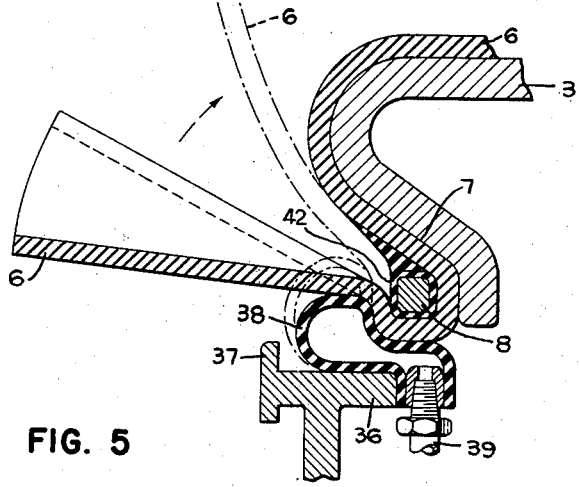

United States Patent Office 2,951,526
Patented Sept. 6, 1960

2,951,526

TIRE BUILDING MACHINE

Jorgen I. Haase, St. Petersburg, Fla., assignor to The Goodyear Tire & Rubber Company, Akron, Ohio, a corporation of Ohio Filed Oct. 2, 1956, Ser. No. 613,530

14 Claims. (Cl. 154—10)

The present invention relates to a tire building machine and particularly to such a machine used for building truck tires with multiple beads, but the invention is also applicable to the building of tires with single beads.

The primary object of this invention is to provide a quick and efficient way of making the turn-up of the fabric ends around the tire beads to position them for a subsequent stitching operation. More specifically, the invention contemplates the use of an inflatable stitching member for stitching the ends of the plies against the inner periphery of the bead and at least partially against the outer surface thereof.

Another object of this invention is to provide a positioning means for quickly and positively locating the pneumatic stitching member in predetermined selected positions axially of the tire building drum. This positioning means comprises a plurality of pneumatic or hydraulic cylinders each having a predetermined stroke and all connected in series to a positioning shaft in such a manner that that shaft can be moved to several selected positions and held firmly in those positions. The number of positions is in excess of the number of cylinders used. The number of positions is determined by the movement of the piston in one cylinder or by the sum of the movements of the pistons in two or more cylinders. All this will be more clearly brought out in the specification as the description proceeds.

In the drawings:

Fig. 2 is a partial radial cross-section through the tire building drum and stitching mechanism showing a step in the tire building operation subsequent to that shown in Fig. 1;

Figs. 3, 4 and 5 are views similar to Fig. 2 showing successive steps in the building operation;

This invention is an improvement on the type of tire building machine illustrated in the Haase Patent 2,488,863 of November 22, 1949, and herein the invention is shown applied to that type of machine. The drawings merely illustrate the invention as applied to making the turn-up at one side of the tire building drum, but it will be understood that the turn-up at the other side of the drum will be made in a similar manner by mounting similar mechanisms at the other side of the drum, somewhat in the same manner as in the aforesaid patent.

Figure 1:
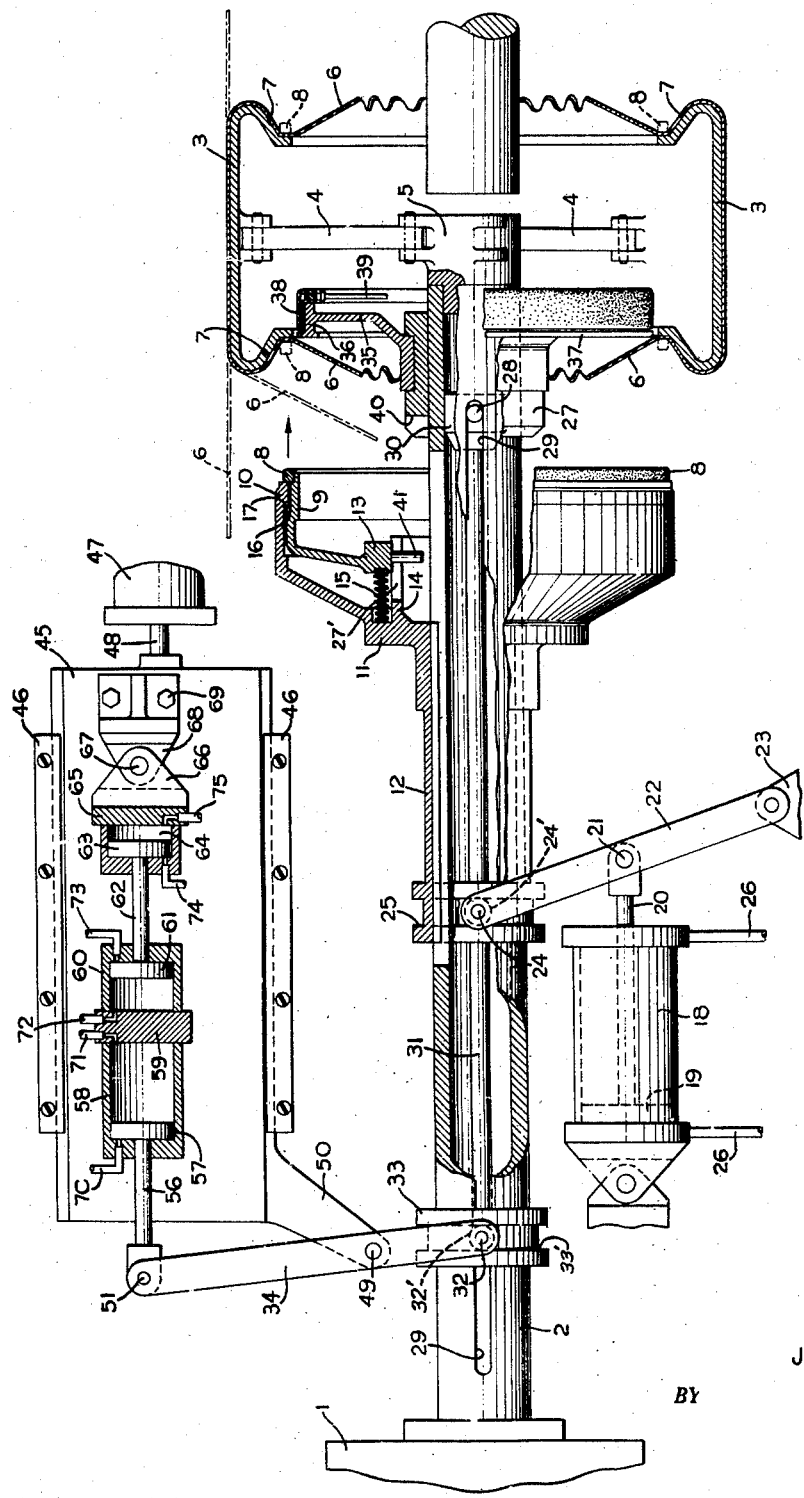
Fig. 1 shows a tire building drum, the bead setting mechanisms and the stitcher means partly in longitudinal section through the axis of the drive shaft, with the operating means more or less schematically illustrated to simplify and clarify the description.

Referring now particularly to Fig. 1, the numeral 1 represents the supporting structure of a tire building machine which rotatably mounts the drum carrying shaft 2. The outer end of this shaft carries a tire building drum 3 on arms 4 mounted on a hub secured to the shaft. This drum is preferably radially collapsible or otherwise removable from within the completed tire structure after the building operation in any of the well-known manners of the prior art. This drum is keyed to rotate with the shaft 2.

The tire fabric is laid on the outer circumferential surface of the drum and projects axially outwardly from the edges thereof when first applied thereto, either in the form of a band or by laying the fabric directly on the drum from a roll or the like as is customary in the art. In Fig. 1 the one edge portion of the fabric 6 is shown in two different dotted line positions, one of which is an extension of the fabric wrapped around the drum and the other of which is inclined downward toward the axis of the drum to form a radially inwardly directed skirt portion, the position it occupies when swabbed down and before application of the bead thereto. The solid line position of the edge portion of the fabric is shown as against the end face 7 of the drum, the position to which it is moved from the second dotted line position by the bead 8 when the bead is moved axially against the fabric. So far, the operation is one that is customary in building tires of this kind. The next operation involves the setting of the bead 8 against the fabric 6. This bead 8 is shown mounted on a bead-carrying drum 9 and in abutment with a bead setting ring 10 which in turn is integral with a flange 11 on a sleeve 12. The bead carrying drum 9 has an inner bearing 13 slidable axially on a hollow boss 14 integral with the flange 11, and this bearing 13 is normally urged to the right by a spring 15 into the position illustrated in Fig. 1. Its movement to the right is limited by the engagement of the abutment shoulder 16 against the inner radial face 17 of the bead setting ring 10.

The bead setting ring together with the bead carrying drum is moved from the position shown in Fig. 1 to the right until the bead 8 is in the dotted line position and in doing so the bead moves the edge of the band into the full line position shown therein. The bead is held in this position firmly by the positive pressure exerted on the bead setting ring 10 by the actuating means therefor. This actuating means comprises a hydraulic or pneumatic cylinder 18 having a piston 19 and a piston rod 20 pivotally connected at an intermediate point 21 to a lever 22 which in turn is pivotally mounted at one end to a fixed support 23 and provided at its other end with a yoke having pins 24 with spaced rollers 24' rotatably mounted and arranged within a groove in the collar 25 on the end of the sleeve 12. By introducing pressure into the cylinder through the port 26 at the left, the piston 19 is moved to the right to force the bead setting ring to the right to bring the bead into the dotted line position shown in Fig. 1. By introducing pressure through the port 26 at the right, the bead setting ring is moved to the left to the full line position shown in Fig. 1. The operative position of the bead setting ring is shown in Fig. 2 wherein the bead 8 is holding the edge 6 against the drum. So far, the mechanism described is similar to that disclosed in the aforesaid patent.

In Fig. 2 the bead is in operative position against the fabric 6 which, as clearly illustrated in that figure, extends downwardly toward the axis of the drum and below the bead area, and it is necessary now to move this depending edge 6 of the fabric axially against the under side of the bead and then radially against the outer radial surface thereof, so that this edge 6 will then extend upwardly along the outer side of the bead and in a direction somewhat as illustrated in Fig. 5. In order to accomplish this result, the shaft 2 (Fig. 1) is provided with a slidable sleeve 27 which is nonrotatably mounted on the shaft 2, the sleeve carrying pin 28 which projects radially inward into a slot 29 provided in the hollow shaft 2. This pin prevents rotation of the sleeve 27 relative to the shaft, but permits longitudinal sliding movement of the sleeve 27 thereon. This pin 28 extends across the space in the hollow shaft through a guide block 30 connected to the end of a rod 31 which, in turn, is connected at its other end by a cross pin (not shown) extending through slot 29 and into the body of the grooved collar 33 slidably mounted on the shaft 32 so that axial movement of the collar on the shaft 2 will move the rod 31 therewith. The collar 33 is actuated by a lever 34 having a roller 32' mounted on pins 32 carried at the lower end thereof and these rollers operate in the groove 33' of the collar 33. This is a common slip collar and lever arrangement for operating mechanical elements where rotational and longitudinal movement must be provided for and is well understood in the art and is shown more specifically in Patent 2,488,863 referred to above. By moving the lever 34, the collar 33, rod 31 and consequently the sleeve 27 will move to the right or left as viewed in Fig. 1.

The sleeve 27 carries a web 35 provided at the outer periphery thereof with a drum-shaped rim portion 36 and at the left there is provided a folding flange or abutment 37 for a purpose to be presently described. As more clearly shown in Figs. 2 to 5 inclusive the rim portion 36 has mounted on the outer surface thereof a portion of an inflatable stitcher 38. This stitcher is formed as a complete annulus similar to an inner tube for a tire and is provided with an inlet and exhaust fitting 39 by means of which air may be introduced into the stitcher to inflate the same and cause the outer surface to move radially outward as more clearly illustrated in Figs. 3, 4 and 5. The stitcher may be cemented to the rim portion 36 to hold the stitcher in the position shown or it may be otherwise fastened thereto. The essential feature is that the rim portion is provided with a stitcher which has an outer circumferential surface which may be moved radially outward when the stitcher is inflated. This stitcher has a yieldable outer surface which is also circumferentially stretchable to permit radial expansion. The flange and stitcher move as a unit and will be referred to herein for convenience as the "stitching mechanism."

Figs. 2, 3, 4 and 5 illustrate successive positions of the stitcher mechanism. Fig. 2 illustrates the position of the stitching mechanism after the swabbing down of the edge portion 6 of the fabric against the end of the drum and the positioning of the bead against the fabric. Fig. 3 illustrates the next position of the stitching mechanism. During the movement of the stitching mechanism from the position shown in Fig. 2 to that shown in Fig. 3, the flange 37 pushes the fabric to the left and somewhat outwardly and when the stitching mechanism reaches the position shown in Fig. 3 air is introduced into the stitcher 38 through the inlet fitting 39, the timing of the introduction of this air being controlled by any suitable mechanism in the various steps. Such controls are well understood in the art. They generally consist of electrical mechanisms which operate in timed sequence to open the valves which will introduce or exhaust the air from the supply lines.

The inflation at the position shown in Fig. 3 is only momentary and is for the purpose of insuring the adhesion of the fabric to the under side of the bead 8 commonly referred to as "tacking," so that when the turn-up is made around the outer radial face of the bead as in Fig. 5, there will be no tendency for the fabric to crawl back and have a loose fit around the bead itself. However, the stitcher is stopped at this position shown in Fig. 3 only for the momentary application of pressure. The fabric itself is moved from the position shown in Fig. 2 to the position shown in Fig. 3 by the flange 37 which is somewhat less in outer radial dimension than the inner diameter of the bead less the thickness of the fabric under the bead, and the purpose of this flange is to move the fabric into axially extending position rather than to require the stitcher 38 to do this. On the other hand, in handling light fabrics the flange could be eliminated and the edge of stitcher could be used for this purpose. Since the stitcher is made of flexible material it will not necessarily form a firm abutment for moving stiff fabrics and the material may cause the stitcher to roll in such a manner that it will not be in the proper position at the time of inflation.

Of course, in order that the stitcher mechanism may operate as shown in Fig. 3, it is necessary to move the bear carrying drum 9 out of the position it occupies in Fig. 2, and in order to accomplish this it will be noted in Fig. 1 that the sleeve 27 has a notch 27' forming an abutment shoulder 40 which is adapted to engage a pin 41 on the bearing 13 at the time, or shortly after the time, the stitcher mechanism starts its movement from its position shown in Fig. 2 to the position shown in Fig. 3. This causes the carrying drum 9 to be moved just free of the bead 8 against the action of spring 15, while at the same time the bead setting ring 10 which is being urged toward the drum 7 by the pressure in the cylinder 18, remains in operative position to keep the bead positively held against the end flange of the drum.

After deflation of the stitcher 38 it is moved to the position shown in Fig. 4, in which position the major portion of the inflatable stitcher is to the left of the bead and a subsequent inflation of the stitcher will move the outer end of the fabric edge 6 to a position such as shown by solid lines in Fig. 5 in which position at least a portion of the fabric lies against the outer radial face 42 of the bead. In Fig. 5 the bead-holding ring 10 has been removed to permit expansion of stitcher 38 upwardly along the outer axially facing surface of the bead. The amount of this engagement can be governed by the amount of inflation of the stitcher and the size thereof. It is even possible to make the stitcher large enough in cross-section to be capable of stitching the fabric edge a considerable distance upwardly along the side of the bead to entirely cover the bead and to stitch the fabric edge to the portion thereof which is already lying closely against the drum somewhat as illustrated by dotted lines in Fig. 5.

When the fabric edge is in the position shown in Fig. 5, it is possible to use a suitable stitcher wheel (not shown) of any of the well-known varieties to complete the stitching of the fabric upwardly along the side of the bead and the fabric lying against the end face 7 of the drum. Of course, it will be understood that before this latter stitching operation takes place the stitcher 38 is preferably deflated to make room for the usual stitching wheel, and preferably the stitching mechanism 38 should be moved back to its original position as shown in Fig. 1, or to the position shown in Fig. 6 if a second bead is to be applied.

As is well known in the art, it is desirable in some instances to provide two and even three beads in a truck tire or large size off-the-road tires. In this case the application of the additional beads is very similar to the application of the first bead, and these beads are generally applied in parallel relation to the first bead in a manner which is well understood in the art. In order to apply such additional beads together with the fabric that is wrapped around the beads, the steps are substantially the same as the steps described with reference to Figs. 2 to 5 inclusive.

Figs. 6, 7, 8 and 9 illustrate the manner of applying a second bead to the tire and in these views the same reference characters refer to the similar parts in Figs. 2, 3, 4 and 5, and it will be noted that except for the axial position of the stitcher with reference to the drum, the operation is substantially the same for the second bead as for the first bead. The second bead is usually of greater internal diameter than the first bead and its inner circumferential surface is, therefore, spaced radially outward a greater distance than that of the first bead as clearly shown in Figs. 6 to 9 inclusive, but, by the use of the expansible stitcher 38, it is possible to use the same stitcher for stitching the fabric around the second bead as around the first bead. Also, in these figures the reference character 43 represents the second bead and the second layer or layers of fabric to be wrapped around the bead 43 are indicated at 44, and without any further description it will be noted from an inspection of these figures that the steps employed in turning the fabric around the beads are substantially the same as those employed for the first bead as illustrated in Figs. 2 to 5 inclusive.

Figure 6:
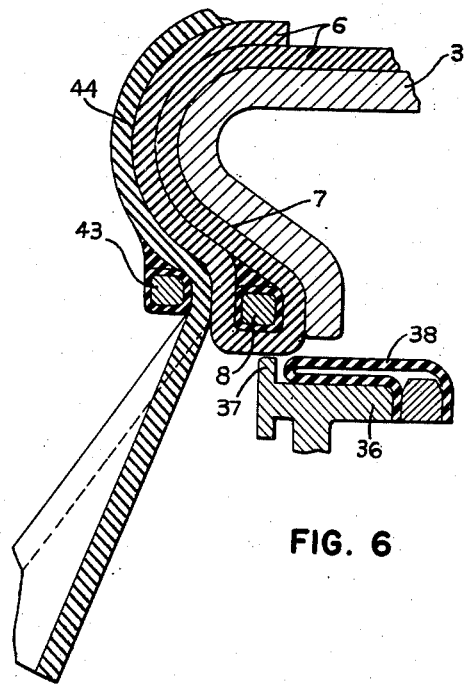
Figs. 6, 7, 8 and 9 show successive steps in applying a second bead.
Figure 7:
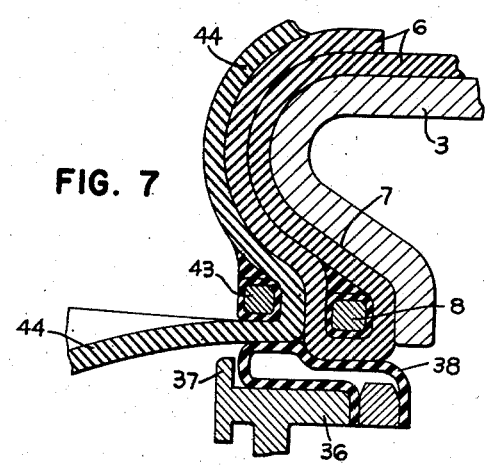
Figure 8:
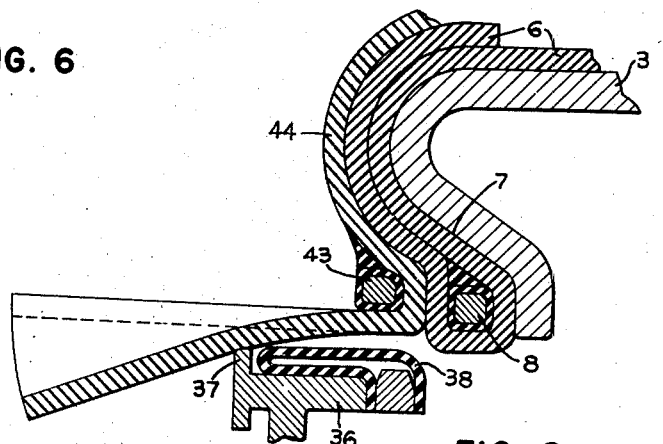
Figure 9:
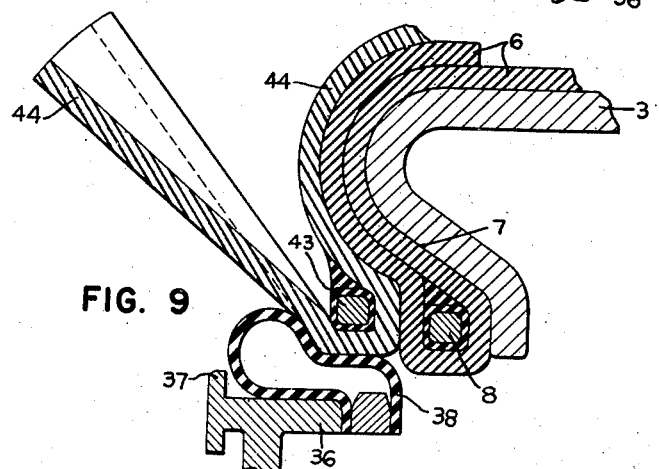

In setting the second bead 43, since the inner circumference is greater than that of the first bead, it is necessary to provide a bead supporting drum such as 9 with a stepped surface, one surface being greater in diameter than the other for the purpose of positioning the second bead and accurately centering it in proper location with respect to the end of the drum. This can also be accomplished by providing a radially expansible seat on the drum 9 which can be quickly changed to support the additional bead. However, such mechanisms are well known in the art and a description thereof is unnecessary since the invention is herewith concerned primarily with the stitching operation which is employed to form the fabric around the beads, whether there is one bead or a series of beads. The different positions for the stitcher have been described with reference to Figs. 2 to 9 inclusive and there are actually six different positions for the stitchers. The three positions for the stitcher in wrapping the fabric edge 6 around the first bead are shown in Figs. 2, 3 and 4 and the second three corresponding positions for wrapping the edge of the fabric 44 around the second bead are illustrated in Figs. 6, 7 and 8. The positions shown in Figs. 5 and 9 are similar to the positions in Figs. 4 and 8 respectively, except that the stitcher is shown deflated in Figs. 4 and 8 and inflated in Figs. 5 and 9.

Referring now to Fig. 1, there is shown in the upper left hand portion thereof a slide 45 mounted to slide in fixed guides 46 and this slide is movable parallel to the axis of the shaft 2 by means of a fluid introduced into the cylinder 47 which is provided with a piston (not shown) connected to the piston rod 48 rigidly attached to the slide 45. It will be noted that the lever 34 is pivoted at 49 to an arm 50 on the slide 45 and the upper end of the lever 34 is pivoted at 51 to piston rod 56 connected to a piston 57 operated within a cylinder 58 which in turn is rigidly connected as by the end wall 59 to another cylinder 60 which in turn has a piston 61 connected by a piston rod 62 to another piston 63 operating in a cylinder 64 which has an end wall 65 carrying a bracket 66 pivoted at 67 to a bracket 68 secured by bolts 69 to the slide 45. The cylinder 58 has ports 70 and 71 for introducing fluid under pressure into the cylinder at opposite sides of the piston 57. Similar ports 72 and 73 are provided for the cylinder 60 and similar ports 74 and 75 are provided for the cylinder 64.

By introducing fluid under pressure into the selected one or combination of the cylinders at the proper side of the piston or pistons, the amount of movement given to the lever 34 will be determined. In each case the stroke of the pistons 57, 61 and 63 are predetermined and may be regulated within fine limitation if desired by the use of adjustable abutment stops (not shown) in the ends of the cylinders, if such a fine adjustment is desired. However, for normal purposes where the selected positions are known to have a certain spacing the lengths of the cylinders themselves can be so designed as to give the proper movement to the lever 34 by using the full stroke of the piston within the cylinder as herein illustrated. It is old to employ fluid operating means for moving parts of a machine, but generally speaking such movement is controlled by a series of stops which are moved into and out of position to limit the movement of the particular part.

By providing cylinders of different lengths, and selectively positioning the pistons of the cylinders at different ends thereof a total movement of the lever 34 may be obtained which will be the algebraic sum of the movement of the pistons within their respective cylinders. Merely by way of example the cylinders in the tire building machine described herein are of such lengths that the pistons 57, 61 and 63 will have a total movement of 2⅛″, 1″ and ½″ respectively. In Figs. 1 and 10 to 14 inclusive I have shown some of the combinations used to effect a given stroke to the outer end of the lever 34 at the pivot point 51. The amount of this stroke as translated to the rod 31 is governed by the position of the pivot 49 shown in Fig. 1. If the position of the pivot 49 is half way between the points 32 and 51 then the movement of the rod 31 would correspond to the movement of the pivot 51. Otherwise, it would be in direct proportion to the lengths of the lever 34 on opposite sides of the pivot 50.

Figure 10:
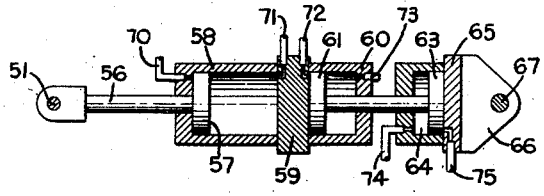
Figs. 10, 11, 12, 13 and 14 are diagrammatic views illustrating the various positions of the cylinders and pistons for accomplishing the selective movement of the stitching mechanism.
Figure 11:
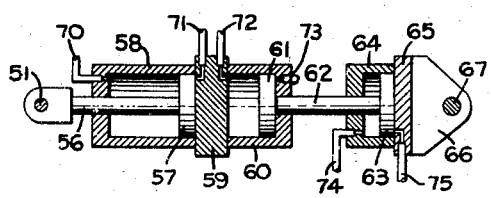
Figure 12:
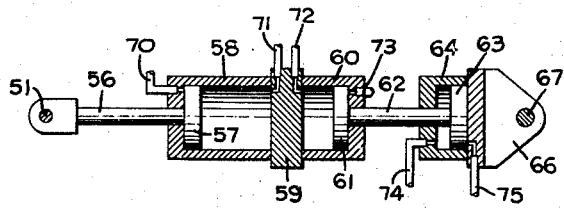
Figure 13:
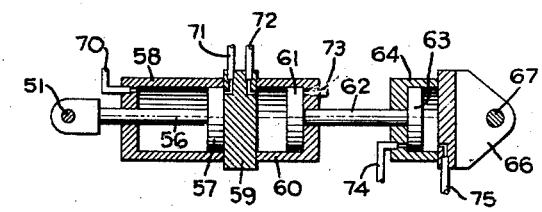
Figure 14:
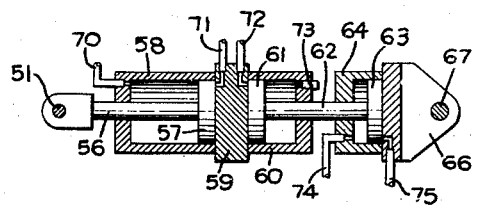

The arrangement of the pistons in the cylinders in Figs. 1, 10 and 11 are the positions occupied to give the respective positions for the stitcher shown in Figs. 2, 3 and 4 respectively and the position of the pistons shown in Figs. 12, 13 and 14 are for the positions of the stitcher shown in Figs. 6, 7 and 8.

The position of the pivot 51 and consequently the position of the stitcher 38 will be determined by the positions of the respective pistons in the cylinders. In Figs. 1, 10, 11, 12, 13 and 14 I have shown the piston positions utilized for the purposes of this invention. These positions will result in positioning the stitching mechanism in the positions indicated in Figs. 2, 3, 4, 6, 7 and 8 respectively. (Figs. 5 and 9 are same positions as Figs. 4 and 8 respectively except they show the stitcher inflated.) Assuming that in the illustrated embodiment the pistons 57, 61 and 63 have a permissible total travel in their respective cylinders that each, if operated alone, would impart movement to the stitcher in amounts of 2⅛″, 1″ and ½″, respectively, and selected combinations of piston positions will give a total movement of the stitcher from its initial position (shown in Fig. 1) in the amounts shown in the table below—all amounts in the last column being measured from the initial or starting position of the stitcher. In the chart the letters R and L indicate the right and left piston positions in their respective cylinders.

| Stitcher Position | Piston and Cylinder Arrangement | Piston Positions in Cylinders | | | Total Stitcher Movement, inches |
|---|---|---|---|---|---|
| | | 57 | 61 | 63 | |
| Fig. 2 | Fig. 1 | L | R | L | 0 |
| Fig. 3 | Fig. 10 | L | L | R | 1½ |
| Fig. 4 | Fig. 11 | R | R | R | 2⅝ |
| Fig. 6 | Fig. 12 | L | R | R | ½ |
| Fig. 7 | Fig. 13 | R | R | L | 2⅛ |
| Fig. 8 | Fig. 14 | R | L | R | 3⅝ |

From an inspection of the above chart it will be noted that to move the stitcher from the first position (Fig. 2) to the second position (Fig. 3) it is necessary to move the pistons 61 and 65 in cylinders 60 and 64 to the opposite ends of the cylinder from the positions illustrated in Fig. 2. Next, to move to position 3 (Fig. 4) it is necessary to reverse the positions of the pistons 57 and 61 in cylinders 58 and 60. Next to move to position 4 (Fig. 6) it is only necessary to reverse the position of the piston 57 in cylinder 58. To then move to position 5 (Fig. 7) it is necessary to reverse the positions of the pistons 57 and 63 in cylinders 58 and 64, and finally to move from position 5 to position 6 (Fig. 8), it is necessary to reverse the positions of the pistons 61 and 63 in cylinders 60 and 64. To then return the stitcher to the first position (Fig. 2) it will be necessary to reverse the position of the pistons 57, 61 and 63 in cylinders 58, 60 and 64.

The mechanism for causing flow of the fluid from one side of a piston to the other, by introducing fluid into the cylinder and exhausting it from the cylinder through the respective ports provided for the cylinders to achieve the necessary piston movement, is not illustrated but is within the knowledge of those skilled in the art to provide such a means for controlling the flow of fluid to the desired sides of the pistons. The ports of each cylinder can be connected by means of a reversible valve (not shown) which alternately introduces fluid into one end of the cylinder and then to the other, while simultaneously exhausting the fluid from the opposite end of the cylinder, and these valves may be controlled by means of suitable mechanical means (not shown) or preferably electrically controlled mechanical movements consisting of suitable relays (not shown) set in motion or made inoperative by a selective cam device (not shown) operating in the desired sequence to secure the movements set forth above. Such mechanism may be controlled by the operator manually or may be controlled automatically as desired. A principal object of this invention is to provide in a construction of this kind, means for quickly and positively locating the stitcher mechanism in its proper position with respect to the tire drum.

The means for controlling the introduction and exhausting of the fluid from the inflatable stitcher can be similarly controlled by suitable valve means operated manually or by mechanical elements which in turn may be electrically controlled in a manner well understood in the art.

In the form of the invention shown in the drawings there are some additional combinations of piston positions not utilized which would give positions to the stitcher other than those illustrated, but it is evident that the number of positions that may be obtained with the use of three cylinders is more than the number of cylinders and by providing four or more cylinders the number of piston positions could be greatly increased.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. In a tire building machine, the combination with a tire building drum having an outer tire building surface and end faces for shaping a tire, at least one of the ends of said drum being recessed axially inward of said end face to receive a bead stitcher, a stitcher mounted for movement axially of said drum into and out of said recess and comprising a fluid receiving chamber having a radially outwardly expansible outer circumferential wall and means for introducing fluid under pressure into said chamber to expand said wall to stitch the material from which the tire is made against the inner surface of a tire bead positioned adjacent said end face when said stitcher is moved out of said recess, and an abutment adjacent said stitcher axially to one side thereof for folding material axially outward within a tire bead positioned adjacent said end face.

2. A tire building machine as set forth in claim 1 in which the stitcher is provided with rigid folding means for engaging the material to be wrapped about the bead of a tire to move it axially so as to project through a tire bead positioned adjacent said end face as the stitcher moves from within said recess to a position out of said recess and into a position opposed to the inner radial facing circumference of said bead.

3. A tire building machine as set forth in claim 1 in which said stitcher is mounted for movement out of said recess to a position in which a portion of said flexible expansible outer wall extends beyond the bead position and is expansible radially to a position to move the tire material upwardly along the axially facing side of the bead away from said drum.

4. A tire building mchine as set forth in claim 1 in which said stitcher has an expansible outer wall in which said expansible outer wall is flexible and is of a width axially of the drum greater than the width of the bead to be used in building the tire whereby upon expansion of said wall a portion of said wall will compact the tire material against the inner surface of the bead and move another portion thereof against an outer lateral side of the bead adjacent to said inner surface.

5. In a tire building machine the combination of a tire building drum and a stitcher mounted for movement axially of said drum to and from a stitching position adjacent an end thereof and for compacting fabric against the inner surface of a tire bead employed in building a tire, said stitcher comprising a rigid annular support, an annular hollow inflatable chamber mounted on said annular support and having its outer wall radially expansible when fluid under pressure is introduced into said chamber, and an annular rigid wall on said annular support positioned axially on said support to one side of said annular chamber, said rigid wall and the outer wall of said chamber when uninflated being of a diameter less than the inner diameter of the aforesaid bead whereby the annular rigid wall may pass freely through the bead and move a depending portion of tire material extending inwardly of the bead into a position across the inner surface of the tire bead to thereby position said fabric in a position to be compacted against the inner surface of the tire bead by said expansible annular chamber.

6. A tire-building machine comprising a tire-building drum having an outer circumferential surface and adjacent axially facing end surfaces over which the tire fabric is formed into a substantially cylindrical band with radially inwardly directed skirt portions lying adjacent said end surfaces, a bead setting mechanism at each end of said drum for setting beads against the respective adjacent skirt portions radially outward of the inner edges thereof, an axially movable support at each end of said drum, means for moving each said support axially of said drum after setting of the beads, an abutment on each said support for simultaneously folding all portions of the inner edge of the adjacent skirt portion into an axially extending position facing the inner circumferential surface of its respective bead, said abutment being of such a size as to pass freely through the bead with a clearance greater than the thickness of said skirt portion, a circumferentially arranged radially expansible stitcher mounted on each said support adjacent the associated abutment for simultaneously stitching all of the opposed areas of the inner circumference of the bead and the axially projecting part of said skirt portion into firm engagement with each other after folding of said skirt portion into axially extending position by said abutment, and means for expanding said stitcher radially.

7. A tire-building drum as set forth in claim 6 in which the circumferential surface of each said stitcher is made of resilient material readily conformable to the surface being stitched.

8. A tire-building machine comprising a tire-building drum having an outer circumferential surface and adjacent axially facing end surfaces over which the tire fabric is formed into a substantially cylindrical band with radially inwardly directed skirt portions lying adjacent said end surfaces, a bead setting mechanism at each end of said drum for setting beads against the respective adjacent skirt portions radially outward of the inner edges thereof, an axially movable support at each end of said drum, means for moving each said support axially of said drum after setting of the beads, an abutment on each said support for simultaneously folding all portions of the inner edge of the adjacent skirt portion into an axially extending position facing the inner circumferential surface of its respective bead, said abutment being of such a size as to pass freely through the bead with a clearance greater than the thickness of said skirt portion, a circumferentially arranged fluid chamber mounted on each said support adjacent the associated abutment having an outer expansible wall for simultaneously stitching all of the opposed areas of the inner circumference of the bead and the axially projecting part of said skirt portion into firm engagement with each other after folding of said skirt portion into axially extending position by said abutment, and means for introducing fluid under pressure to said chamber to expand all circumferential portions of said wall simultaneously.

9. A tire-building machine as set forth in claim 8 in which the width of the wall axially of the drum is at least as great as the width of the bead in the same direction.

10. A tire-building drum as set forth in claim 8 in which the width of the wall axially of the drum is substantially greater than the width of the bead in the same direction whereby as said wall expands a portion thereof moves radially outwardly to one side of said bead to move the edge of the skirt portion radially outward against the outer axially facing surface of said bead.

11. A tire-building machine as set forth in claim 8 in which means is provided for moving said stitcher to any one of a plurality of selected operative positions axially of the drum and for retaining said stitcher in such selected position during the stitching operation.

12. A tire-building machine as set forth in claim 8 in which the folding member is separate from said chamber.

13. A tire-building machine as set forth in claim 8 in which each said fluid chamber is a hollow annular flexible and expansible rubber tube which is mounted circumferentially on its respective support.

14. A tire-building machine as set forth in claim 8 in which each said support is mounted for movement to a first axial position in which the said expansible wall does not project materially beyond the outer radial surface of a properly positioned tire bead and to a second axial position in which said wall extends materially beyond said outer radial surface of the bead and in which the wall is readily expansible and flexible so as to engage at its second position the edge of the skirt to move it radially outward along the outer radial side of the bead and the side wall of the tire.

References Cited in the file of this patent

UNITED STATES PATENTS

| | | |
|---|---|---|
| 2,251,904 | Breth et al. | Aug. 12, 1941 |
| 2,443,551 | Beam | June 15, 1948 |
| 2,488,863 | Haase | Nov. 22, 1949 |
| 2,565,071 | Frazier | Aug. 21, 1951 |
| 2,567,064 | Frazier | Sept. 4, 1951 |
| 2,752,983 | George | July 3, 1956 |
| 2,754,884 | Jefferys et al. | July 17, 1956 |
| 2,754,886 | Bishop | July 17, 1956 |